(12) United States Patent
Molla

(10) Patent No.: US 11,988,330 B1
(45) Date of Patent: May 21, 2024

(54) REMOVING MOISTURE FROM A LUBRICANT RESERVOIR

(71) Applicant: Saudi Arabian Oil Company, Dhahran (SA)

(72) Inventor: Hasanur Jamal Molla, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 27 days.

(21) Appl. No.: 17/984,574

(22) Filed: Nov. 10, 2022

(51) Int. Cl.
| | | |
|---|---|---|
| *B01D 35/18* | (2006.01) |
| *F16N 35/00* | (2006.01) |
| *F16N 39/00* | (2006.01) |
| *F16N 39/04* | (2006.01) |
| *F01M 11/03* | (2006.01) |

(52) U.S. Cl.
CPC ............ *F16N 39/04* (2013.01); *F16N 35/00* (2013.01); *F16N 39/005* (2013.01); *F01M 11/03* (2013.01); *F01M 2011/033* (2013.01); *F01M 2011/038* (2013.01)

(58) Field of Classification Search
CPC .. F16N 39/04; F16N 39/005; F01M 2011/038
See application file for complete search history.

(56) References Cited

U.S. PATENT DOCUMENTS

| | | | | |
|---|---|---|---|---|
| 4,089,662 A * | 5/1978 | Williams | ................. | B01D 3/00 196/132 |
| 5,327,998 A * | 7/1994 | Rosado | ................... | F16N 17/02 184/104.1 |
| 6,224,716 B1 * | 5/2001 | Yoder | ...................... | B01D 3/06 159/901 |
| 7,407,474 B2 * | 8/2008 | Smith | .................. | B01D 17/005 494/901 |
| 8,496,740 B1 * | 7/2013 | Ball, IV | ............. | B01D 17/0208 96/183 |
| 8,506,815 B2 * | 8/2013 | Nemser | ................ | B01D 61/362 95/52 |
| 11,867,357 B1 * | 1/2024 | Sidorovich Paradiso | .................... | B01D 19/0052 |
| 2002/0063087 A1 * | 5/2002 | Spearman | .............. | B01D 61/36 210/433.1 |
| 2006/0102133 A1 * | 5/2006 | Callan | ...................... | F01M 1/18 123/196 R |

(Continued)

FOREIGN PATENT DOCUMENTS

| | | | | |
|---|---|---|---|---|
| CA | 2291763 | | 12/1998 | |
| DE | 10312902 A1 * | 9/2004 | ............. | F01M 11/10 |
| EP | 3563045 | | 11/2019 | |

*Primary Examiner* — Michael A Riegelman
(74) *Attorney, Agent, or Firm* — Fish & Richardson P.C.

(57) ABSTRACT

Techniques for managing a lubricant fluid include storing a lubricant fluid that includes liquid water in an interior volume of a reservoir, which includes a vapor space above the lubricant fluid that encloses water vapor; circulating, with a blower, a first airflow from the vapor space to an ambient environment to remove at least a portion of the water vapor to the ambient environment; circulating a second airflow to a heater in fluid communication with the vapor space within the interior volume of the reservoir; heating the second airflow with the heater; circulating the heated airflow into the vapor space to reduce a relative humidity of the vapor space; and releasing at least a portion of the liquid water from the interior volume of the reservoir through a control valve coupled to the reservoir.

23 Claims, 3 Drawing Sheets

(56) References Cited

U.S. PATENT DOCUMENTS

| | | | |
|---|---|---|---|
| 2006/0169031 A1* | 8/2006 | Song | G01N 33/2888 |
| | | | 73/53.05 |
| 2012/0080363 A1* | 4/2012 | Evanovich | C10G 33/06 |
| | | | 210/207 |
| 2022/0065397 A1* | 3/2022 | Molla | B01D 1/16 |
| 2022/0252220 A1* | 8/2022 | Molla | F16N 29/04 |
| 2023/0120721 A1* | 4/2023 | Canovali | B01D 1/0011 |
| | | | 210/244 |

* cited by examiner

REMOVING MOISTURE FROM A LUBRICANT RESERVOIR

TECHNICAL FIELD

The present disclosure describes systems and methods for removing moisture from a lubricant reservoir.

BACKGROUND

Contamination in lubricating oil is one of the major causes of rotating equipment failure in industries. It can be advantageous to immediately detect contaminants present in a lubrication fluid and quickly take the corrective action to remove such contaminants in order to maintain the integrity of the rotating machinery. The industry relies on routine lube oil condition monitoring program where lead time is relatively higher; therefore, the contamination causes damage to the equipment before its identification and removal from lube oil system. Even with real-time monitoring of such contaminants, it can take some time to carry out a corrective action after detecting the contaminants in the lubrication fluid. Moreover, purification filters employed by industry to remove contaminants from lubrication fluid is expensive and difficult to manage.

SUMMARY

In an example implementation, a lubricant management system includes a reservoir that includes an interior volume configured to enclose a lubricant fluid that includes liquid water; a blower; a heater, an outlet positioned in the reservoir and having a valve configured to operate to release at least a portion of the liquid water from the interior volume of the reservoir; and a control system communicably coupled to the blower, the heater, and the valve. The blower includes a blower inlet in fluid communication with a vapor space that encloses water vapor within the interior volume of the reservoir above the lubricant fluid, and a blower outlet external to the reservoir. The blower is configured to circulate a first airflow that includes at least a portion of the water vapor from the vapor space to an ambient environment through the blower outlet. The heater includes a heater outlet in fluid communication with the vapor space within the interior volume of the reservoir, and a heater inlet external to the reservoir. The heater is configured to circulate a second airflow into the heater inlet, heat the second airflow to a particular temperature, and circulate the heated airflow into the vapor space.

An aspect combinable with the example implementation further includes a moisture sensor positioned in the interior volume and configured to sense an amount of the liquid water in the lubricant fluid when at least partially submerged in the lubricant fluid.

In another aspect combinable with any of the previous aspects, the control system is configured to perform operations including comparing the sensed amount of the liquid water with a threshold value of liquid water; and based on the sensed amount exceeding the threshold value of liquid water, operating the control valve to modulate toward fully open.

Another aspect combinable with any of the previous aspects further includes a motor controller electrically connected to the blower.

In another aspect combinable with any of the previous aspects, the control system is configured to perform operations including based on the sensed amount exceeding the threshold value of liquid water, operating the motor controller to increase a volumetric flow rate of the first airflow.

In another aspect combinable with any of the previous aspects, the control system is configured to perform operations including at least one of based on the sensed amount exceeding the threshold value of liquid water, operating the heater to increase a volumetric flow rate of the second airflow; or based on the sensed amount exceeding the threshold value of liquid water, operating the heater to increase a temperature of the second airflow.

In another aspect combinable with any of the previous aspects, a relative humidity of the second airflow is less than a relative humidity of the first airflow, and the temperature of the second airflow is greater than a temperature of the first airflow.

Another aspect combinable with any of the previous aspects further includes a pressure sensor positioned in the vapor space of the reservoir and configured to sense an air pressure of the vapor space.

In another aspect combinable with any of the previous aspects, the control system is configured to perform operations including comparing the sensed air pressure with a threshold value of air pressure; and based on the sensed air pressure different than the threshold value of air pressure, operating the motor controller to change the volumetric flow rate of the first airflow.

Another aspect combinable with any of the previous aspects further includes one or more baffles coupled to a bottom surface of the reservoir that extends into the interior volume.

In another aspect combinable with any of the previous aspects, the one or more baffles include a bore therethrough at or near the bottom surface of the reservoir.

In another aspect combinable with any of the previous aspects, the one or more baffles includes one or more first baffles.

Another aspect combinable with any of the previous aspects further includes one or more second baffles coupled to a top surface of the reservoir that extends into the vapor space.

In another aspect combinable with any of the previous aspects, the lubricant fluid includes a lubricant oil configured to lubricate at least a portion of a rotating machine.

In another example implementation, a method for managing a lubricant fluid includes storing a lubricant fluid that includes liquid water in an interior volume of a reservoir, which includes a vapor space above the lubricant fluid that encloses water vapor; circulating, with a blower, a first airflow from the vapor space to an ambient environment to remove at least a portion of the water vapor to the ambient environment; circulating a second airflow to a heater in fluid communication with the vapor space within the interior volume of the reservoir; heating the second airflow with the heater; circulating the heated airflow into the vapor space to reduce a relative humidity of the vapor space; and releasing at least a portion of the liquid water from the interior volume of the reservoir through a control valve coupled to the reservoir.

An aspect combinable with the example implementation further includes sensing an amount of the liquid water in the lubricant fluid; comparing the sensed amount of the liquid water with a threshold value of liquid water; and based on the sensed amount exceeding the threshold value of liquid water, modulating the control valve toward fully open.

Another aspect combinable with any of the previous aspects further includes, based on the sensed amount exceeding the threshold value of liquid water, operating the blower to initiate or increase a volumetric flow rate of the first airflow.

Another aspect combinable with any of the previous aspects further includes at least one of based on the sensed amount exceeding the threshold value of liquid water, operating the heater to initiate or increase a volumetric flow rate of the second airflow; or based on the sensed amount exceeding the threshold value of liquid water, operating the heater to increase a temperature of the second airflow.

In another aspect combinable with any of the previous aspects, a relative humidity of the second airflow is less than a relative humidity of the first airflow, and the temperature of the second airflow is greater than a temperature of the first airflow.

Another aspect combinable with any of the previous aspects further includes sensing an air pressure in the vapor space; comparing the sensed air pressure with a threshold value of air pressure; and based on the sensed air pressure different than the threshold value of air pressure, operating the blower to change the volumetric flow rate of the first airflow.

Another aspect combinable with any of the previous aspects further includes facilitating a flow of the lubricant fluid through a bore of one or more baffles coupled to a bottom surface of the reservoir and extending into the interior volume.

In another aspect combinable with any of the previous aspects, the lubricant fluid includes a lubricant oil configured to lubricate at least a portion of a rotating machine.

In another example implementation, a system includes a tank including an interior volume configured to enclose a lube oil that includes water; a fan positioned with an inlet in airflow communication with a vapor space that encloses water vapor within the interior volume of the tank above the lubricant fluid; heater positioned with an outlet in airflow communication with the vapor space; moisture sensor positioned in the interior volume to contact the lubricant fluid; and a control system communicably coupled to the fan, the heater, and the moisture sensor. The control system is configured to perform operations including: receiving a value of sensed water in the lube oil, and based on the value of sensed water being greater than a predetermined value of water, opening a valve to release a portion of the water from the tank and operating the heater to flow heated air into the vapor space.

In an aspect combinable with the example implementation, the operations further include based on the value of sensed water being greater than the predetermined value of water, operating the fan to flow at least a portion of the water vapor from the vapor space to an ambient environment.

In another aspect combinable with any of the previous aspects, the value is a first value and the operations further include receiving a second value of sensed water in the lube oil subsequent to the first value, and based on the second value of sensed water being less than the predetermined value of water, operating the heater to stop or decrease the flow of heated air into the vapor space.

In another aspect combinable with any of the previous aspects, the operations further include receiving a value of sensed air pressure in the vapor space.

In another aspect combinable with any of the previous aspects, based on the value of sensed air pressure being less than a predetermined value of air pressure, the operations further include at least one of operating an airflow valve in fluid communication with the vapor space toward a fully open position; or operating the fan to decrease an airflow from the vapor space to the ambient environment.

In another aspect combinable with any of the previous aspects, based on the value of sensed air pressure being greater than a predetermined value of air pressure, the operations further include at least one of operating an airflow valve in fluid communication with the vapor space toward a fully closed position; or operating the fan to increase an airflow from the vapor space to the ambient environment Implementations of systems and methods for removing moisture from a lubricant reservoir according to the present disclosure can include one, some, or all of the following features. For example, described systems and methods according to the present disclosure can absorb moisture from a lubricant fluid and provide for a "dry" lubricant fluid (for example, lubricant fluid free or substantially free from water) exclusive of any water removal filter. As another example, described systems and methods according to the present disclosure can remove water from the lubricant fluid immediately after detection and prior to the water causing damage to rotating equipment that receives and uses the lubricant fluid. As another example, described systems and methods according to the present disclosure can be implemented as a modification of a lubricating oil reservoir through additional components to facilitate removal of moisture from the lubricating oil without deploying a dedicated water removal filtration system.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
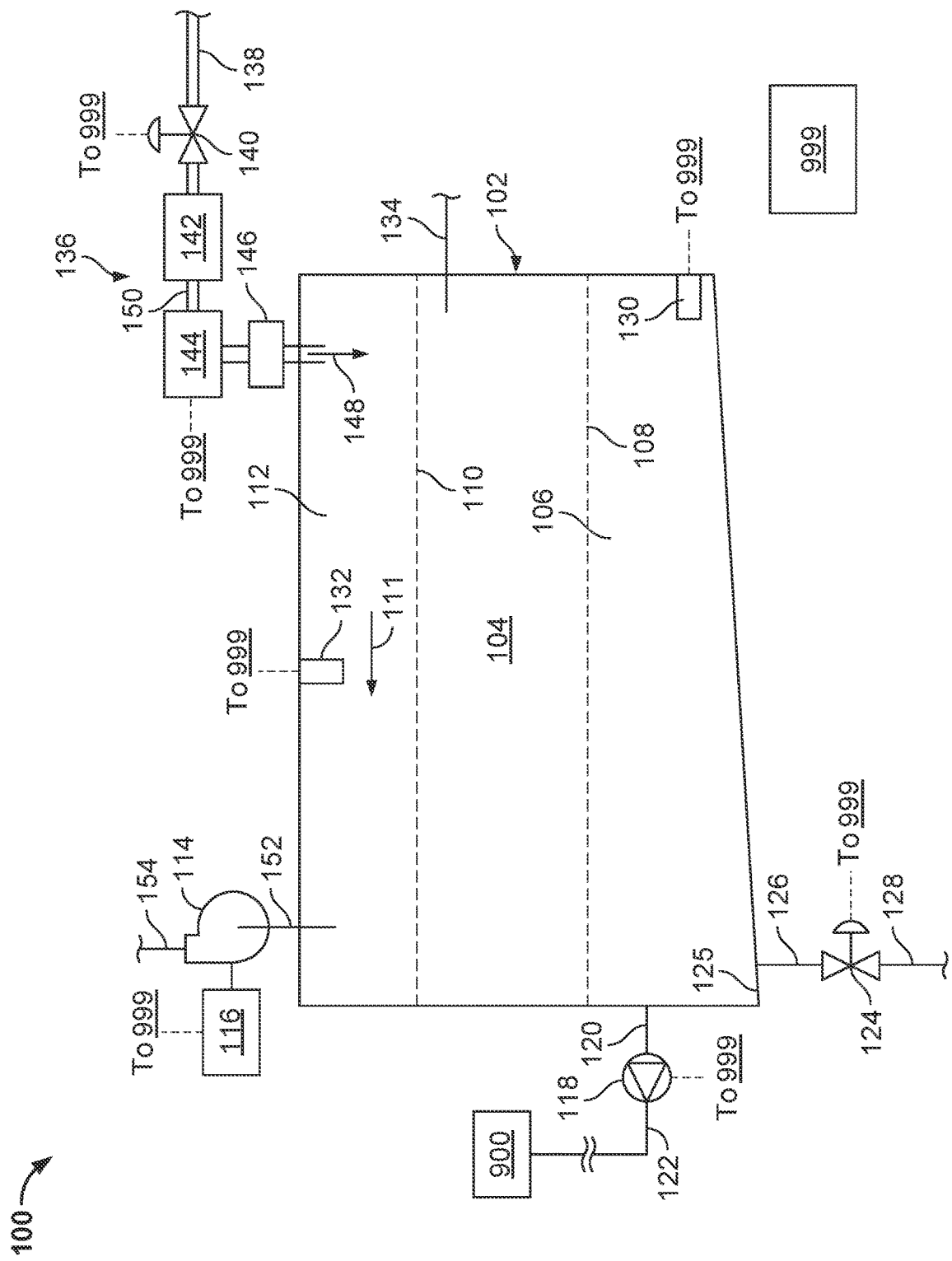
FIG. 1 is a schematic illustration of an example implementation of a lubricant processing system according to the present disclosure.

FIG. 1 is a schematic illustration of an example implementation of a lubricant processing system 100 according to the present disclosure. Generally, lubricant processing system 100 is operable to manage a lubricant fluid 106 to ensure or help ensure that the lubricant fluid 106 (for example, lubricating, or lube, oil) is clean and free of contaminants before providing the fluid 106 to a rotating machine 900 (such as a pump, compressor, fan, generator, or other machine or rotating equipment). In some aspects, the lubricant processing system 100 can be an integral part of the rotating machine 900. In general, the lubricant processing system 100 operates to detect a contaminant, such as water and/or water vapor, in a reservoir that holds the lubricating fluid 106 through a moisture (or water) sensor. Free water in the lubricating fluid 106 can be drained, while moist air in the reservoir can be extracted and, for instance, replaced with warmer, drier air to maintain or help maintain the lubricating fluid 106 in a preferred, moisture-free state in the reservoir. Hence, the water in the lubricating fluid 106 can be removed without employing a dedicated purification system in the rotating machine 900 and without giving moisture an opportunity to cause any damage to equipment.

As shown in this example, the lubricant processing system 100 includes a reservoir 102 that has an interior volume 104 sized to hold a volume of the lubricating fluid 106. The volume of the lubricating fluid 106 can fluctuate (for example, based on operation of the rotating machine 900, amount of water in the lubricating fluid 106, or otherwise) between a low level 108 and a high level 110. Once used by the rotating machine 900, lubricating fluid 106 can be returned to the reservoir with a fluid return 134, which in some aspects, can be positioned with an outlet in the interior volume 104 between the low level 108 and the high level 110. In some aspects, the fluid return 134 is placed upward and submerged in the lubricant fluid 106 in order to create more turbulence so that return, wet lubricant fluid 106 (lubricant fluid 106 with water entrained therein) can mix with a heated airflow 148. A vapor space 112 comprises a portion of the interior volume 104 in which a moist airflow 111 comprised of air and water vapor circulates or is found.

As shown in this example, the reservoir 102 includes a low point 125 at which a drain 126 is located and coupled to a control valve 124. The control valve 124 is fluidly coupled to an outlet 128, through which a controllable flow of water in the lubricant fluid 106 that settles at the low point 125 can exit the reservoir 102. As shown, the control valve 124 is communicably coupled (wired or wirelessly) to a control system 999 that is part of or connected to one or more control devices in the lubricant processing system 100.

In this example, one or more pumps 118, which includes a pump inlet 120 and a pump outlet 122, is positioned in fluid communication with the reservoir 102 in order to circulate lubricating fluid 106 to the rotating machine 900. As shown, the pump inlet 120 can be positioned so as to receive lubricating fluid 106 that is free of water, such as above the low point 125 and below the low level 108 of the reservoir 102. The pump 118, or more specifically, a motor controller of the pump motor, is communicably coupled (wired or wirelessly) to the control system 999 in this example. Thus, the control system 999 can control operation of the pump 118 (for example, speed) to circulate the lubricant fluid 106 through the pump inlet 120 and out of the pump outlet 122 to the rotating machine 900.

In the illustrated example of FIG. 1, a moisture (or water) sensor 130 is positioned in the reservoir 102. As shown, the moisture sensor 130 can be positioned at or near a bottom interior surface of the reservoir 102 within the volume 104 (and below the low level 108) so as to submerge the sensor 130 in contact with the lubricant fluid 106 (and water in the lubricant fluid 106). As shown, the moisture sensor 130 is communicably coupled (wired or wirelessly) with the control system 999 to provide data (such as a sensed presence of water in the lubricant fluid 106) to the control system 999.

As shown in FIG. 1, one or more blowers 114 (for example, as centrifugal fans) includes a blower inlet 152 positioned in fluid communication with the vapor space 112 of the interior volume 104. A blower outlet 154 is positioned in or in fluid communication with an ambient environment. In this example, a motor controller 116, such as a variable frequency drive, is electrically coupled to the motor of the blower 114 to control and adjust a volumetric flow rate of the moist airflow 111 to and into the blower inlet 152 and to the ambient environment through the blower outlet 154. As shown, the motor controller 116 is communicably coupled (wired or wirelessly) to the control system 999.

Also in communication (wired or wirelessly) with the control system 999 is a pressure sensor 132. In this example, the pressure sensor 132 is positioned to measure a pressure of the vapor space 112 in the interior volume 104 of the reservoir 102. In some aspects, the pressure sensor 132 transmits or otherwise provides sensed data, such as an air pressure of the vapor space 112 (or pressure differential between the vapor space 112 and the ambient environment) to the control system 999.

In the example implementation of the lubricant processing system 100 shown in FIG. 1, a heater assembly 136 is provided to circulate a heated airflow 148 into the vapor space 112. For example, the heater assembly 136 includes an airflow inlet 138 (in fluid communication with or positioned in the ambient environment), an airflow valve 140 communicably coupled (wired or wirelessly) to the control system 999, a breather 142, a heater 144 (for example, an electric heater), and a flame arrestor 146 (that eliminates a flame from the heater 144 from travelling to the reservoir 102). The components of the heater assembly 136 are fluidly coupled with an airflow conduit 150. As explained in more detail herein, the airflow valve 140 can be operated to adjust a volumetric flow rate of airflow provided to the heater 144, which is heated and circulated as heated airflow 148 into the vapor space 112.

Figure 2:
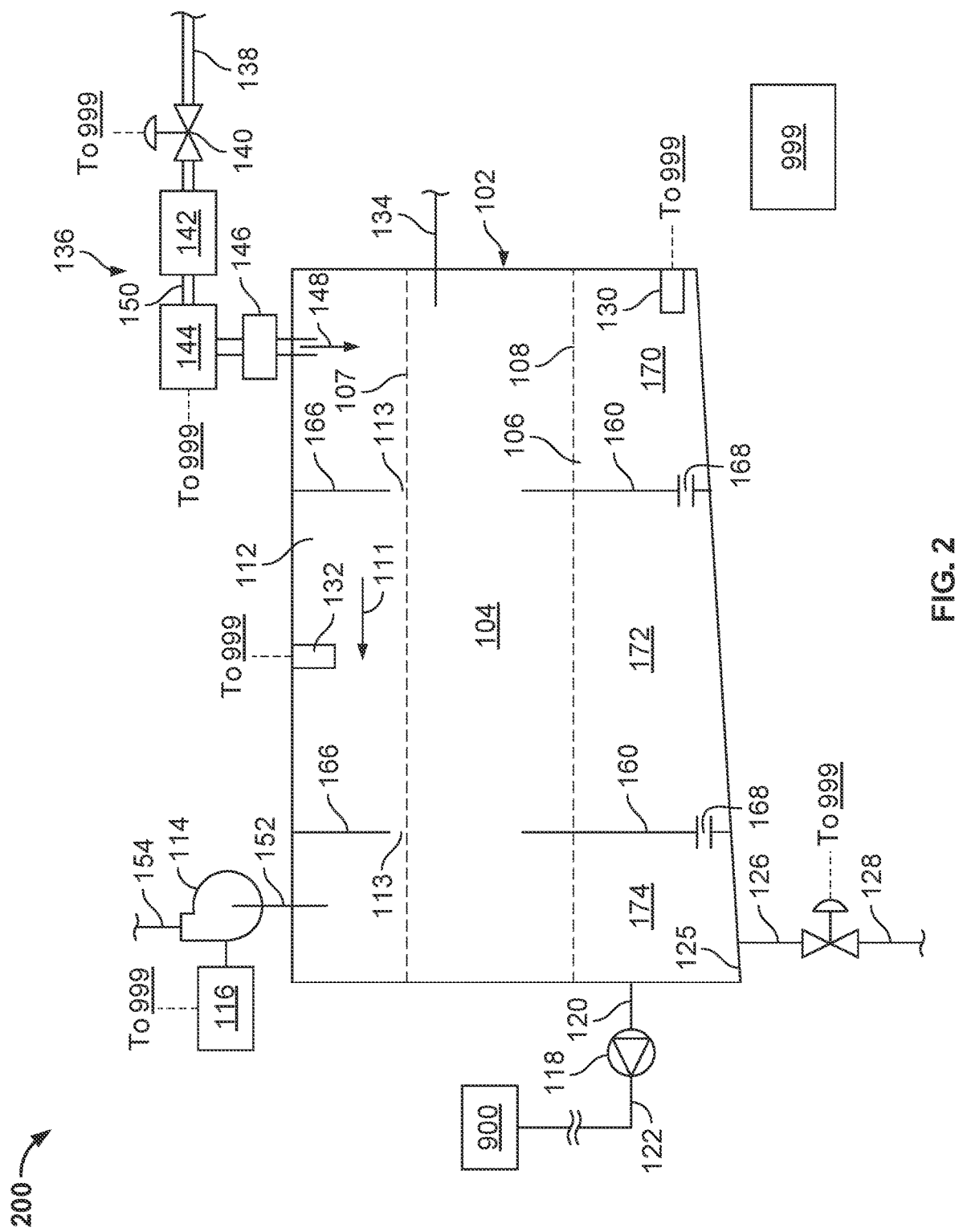
FIG. 2 is a schematic illustration of another example implementation of a lubricant processing system according to the present disclosure.

In some aspects, the control system (or controller) 999 is part of a flow control system that can include one or more flow pumps, fans, blowers, and sensors to move and process the lubricant fluid 106 through the lubricant processing system 100 and to the rotating machine 900. Each of the configurations described herein can include at least one variable frequency drive (VFD) coupled to a respective pump, fan or blower that is capable of controlling at least one fluid flow rate. In some implementations, fluid flow rates are controlled by at least one flow control valve. In some aspects, the control system 999 controls a speed of the blower, heater activation/deactivation, and oil and air control valves opening/closing based on data transmitted by a water sensor and a pressure transmitter. As shown in FIGS. 1 and 2, the phrase "To 999" can refer to unidirectional data communication to or from a particular component and the control system 999, or it can refer to bidirectional communication between the particular component and the control system 999.

In some embodiments, a flow control system can be operated manually. For example, an operator can set a flow rate for each pump or transfer device and set valve open or close positions to regulate the flow of the process streams through the pipes in the flow control system. Once the operator has set the flow rates and the valve open or close positions for all flow control systems distributed across the system, the flow control system can flow the streams under constant flow conditions, for example, constant volumetric rate or other flow conditions. To change the flow conditions, the operator can manually operate the flow control system, for example, by changing the pump flow rate or the valve open or close position.

In some embodiments, a flow control system can be operated automatically. For example, the flow control system can be connected to a computer or control system (e.g., control system 999) to operate the flow control system. The control system can include a computer-readable medium storing instructions (such as flow control instructions and other instructions) executable by one or more processors to perform operations (such as flow control operations). An operator can set the flow rates and the valve open or close positions for all flow control systems distributed across the facility using the control system. In such embodiments, the operator can manually change the flow conditions by providing inputs through the control system. Also, in such embodiments, the control system can automatically (that is, without manual intervention) control one or more of the flow control systems, for example, using feedback systems connected to the control system. For example, a sensor (such as a pressure sensor, temperature sensor or other sensor) can be connected to a pipe through which a fluid flows. The sensor can monitor and provide a flow condition (such as a pressure, temperature, or other flow condition) of the fluid stream to the control system 999. In response to the flow condition exceeding a threshold (such as a threshold pressure value, a threshold temperature value, or other threshold value), the control system 999 can automatically perform operations. For example, if the pressure or temperature in the conduit (or volume 104) exceeds the threshold pressure value or the threshold temperature value, respectively, the control system 999 can provide a signal to the pump or fan to decrease a flow rate, a signal to open a valve to relieve the pressure, a signal to shut down a fluid stream flow, or other signals.

Turning to FIG. 2, another example implementation of a lubricant processing system 200 is shown. In this example implementation, the lubricant processing system 200 includes the previously described components of the lubricant processing system 100, and also includes one or more lower baffles 160 (two or more in this example) and, in some aspects, one or more upper baffles 166 (two or more in this example). As shown, lower baffles 160 can be coupled with (for example, attached to) the bottom surface of the reservoir 102 and can extend upward within the volume 104 to a location above the low level 108. The lower baffles 160 can be positioned to separate the interior volume 104 into chambers 170, 172, and 174, as shown. In this example, one or more bores or apertures 168 can be formed in the lower baffles 160 (such as near where the lower baffles 160 are connected to the reservoir 102). For example, the bores 168 can be sized and positioned to allow contaminated (for example, with moisture and/or other contaminants), heavier lubricant fluid 106 to flow through the bores 168 into a next chamber (for example, from chamber 170 to chamber 172 to chamber 174).

Upper baffles 166 can be coupled with (for example, attached to) an upper surface of the reservoir 102 and extend downward into the vapor space 112. In some aspects, the upper baffles 166 extend to a location above the high level 110 of the lubricant fluid 106. Thus, even if the lubricant fluid 106 is at the high level 110, there can be an air gap 113 between lubricant fluid 106 and the upper baffles 166. This air gap 113 can allow heated airflow 148 to sweep over a surface of the lubricant fluid 106 (thereby helping dry any moisture on such surface). Further, the air gap 113 can help direct the heated airflow 148 and airflow 111 through the vapor space 112.

In an example operation, the lubricant processing system 100 (and lubricant processing system 200) can be operated to remove moisture (for example, water in the lubricant fluid 106 and/or water vapor in the moist airflow 111) such that the moisture does not damage the rotating machine 900 when entrained in the lubricant fluid 106. In some aspects, all or portions of the example operation can be performed by or with the control system 999.

For instance, an example operation can include the moisture sensor 130 sensing an amount of water in the lubricant fluid 106 and providing or transmitting the sensed amount of water to the control system 999. If the sensed amount is greater than a threshold amount (such as greater than a saturation amount), the control system 999 can control the airflow valve 140 to open to allow an airflow into the airflow conduit 150 and turn on the heater assembly 136 to provide the heated airflow 148 to the vapor space 112. The heated airflow 148 can, for instance, help dry the lubricant fluid 106 by absorbing moisture from a top surface of the fluid 106. In some aspects, the heater 144 can be operated to control a temperature of the heated airflow 148 and/or the airflow valve 140 can be operated to control a flow rate of airflow through the valve 140 relative to an amount of moisture sensed by the moisture sensor 130. For example, the greater the amount, the higher the temperature and/or flow rate. If the sensed amount is less than the threshold amount, the control system 999 can maintain the airflow valve 140 and/or heater assembly 136 in their current state or in a non-operating state (such as closed for the airflow valve 140).

The example operation can also include, when the sensed amount is greater than the threshold amount, operating (with the control system 999) the control valve 124 to open, thereby allowing water in the lubricant fluid 106 at the low point 125 to enter the drain 126 and exit the reservoir 102 through the outlet 128. In some aspects, operation of the control valve 124 can happen in parallel or serially with operation of the airflow valve 140 and heater assembly 136. If the sensed amount is less than the threshold amount, the control system 999 can maintain the control valve 124 in a closed state (or, for example, at an existing state when the moisture amount was sensed). In some aspects, if no free water is sensed by the moisture sensor 130, then the control valve 124 is maintained in a closed state.

The example operation can also include, when the sensed amount is greater than the threshold amount, operating (with the control system 999), operating the blower 114 to circulate the moist airflow 111 through the vapor space 112 and into the blower inlet 152 (where it is then circulated to the ambient environment through the blower outlet 154). In some aspects, the motor controller 116 (for example, as a variable frequency drive) can be operated to control a flow rate of the moist airflow 111 relative to the amount of moisture sensed by the moisture sensor 130. For example, the greater the amount, the greater the flow rate of the moist airflow 111 circulated to the ambient environment by the blower 114 (through a higher frequency or greater speed of the blower 114 controlled by the motor controller 116). If the sensed amount is less than the threshold amount, the control system 999 can maintain the blower 114 in an off state (or, for example, at an existing state when the moisture amount was sensed).

The example operation can also include the pressure sensor 132 measuring an air pressure of the vapor space 112 (or a pressure differential between the vapor space 112 and the ambient environment). In some aspects, the air pressure in the vapor space 112 can be maintained lower than atmospheric pressure of the ambient environment to ease a return of the lubricant fluid 106 to the reservoir 102. Thus, when the sensed amount of air pressure is greater than a threshold amount, a flow rate of moist airflow 111 circulated by the blower 114 can be increased (for example, proportionally by increasing the speed of the blower 114 by the motor controller 116) to create more vacuum (a lower air pressure) in the reservoir 102. Further, in some aspects, based on the sensed amount of air pressure being greater than the threshold amount, the airflow valve 140 can be controlled or adjusted toward an open position to increase a flow rate of air to the reservoir 102 to maintain the preferred vacuum.

Figure 3:
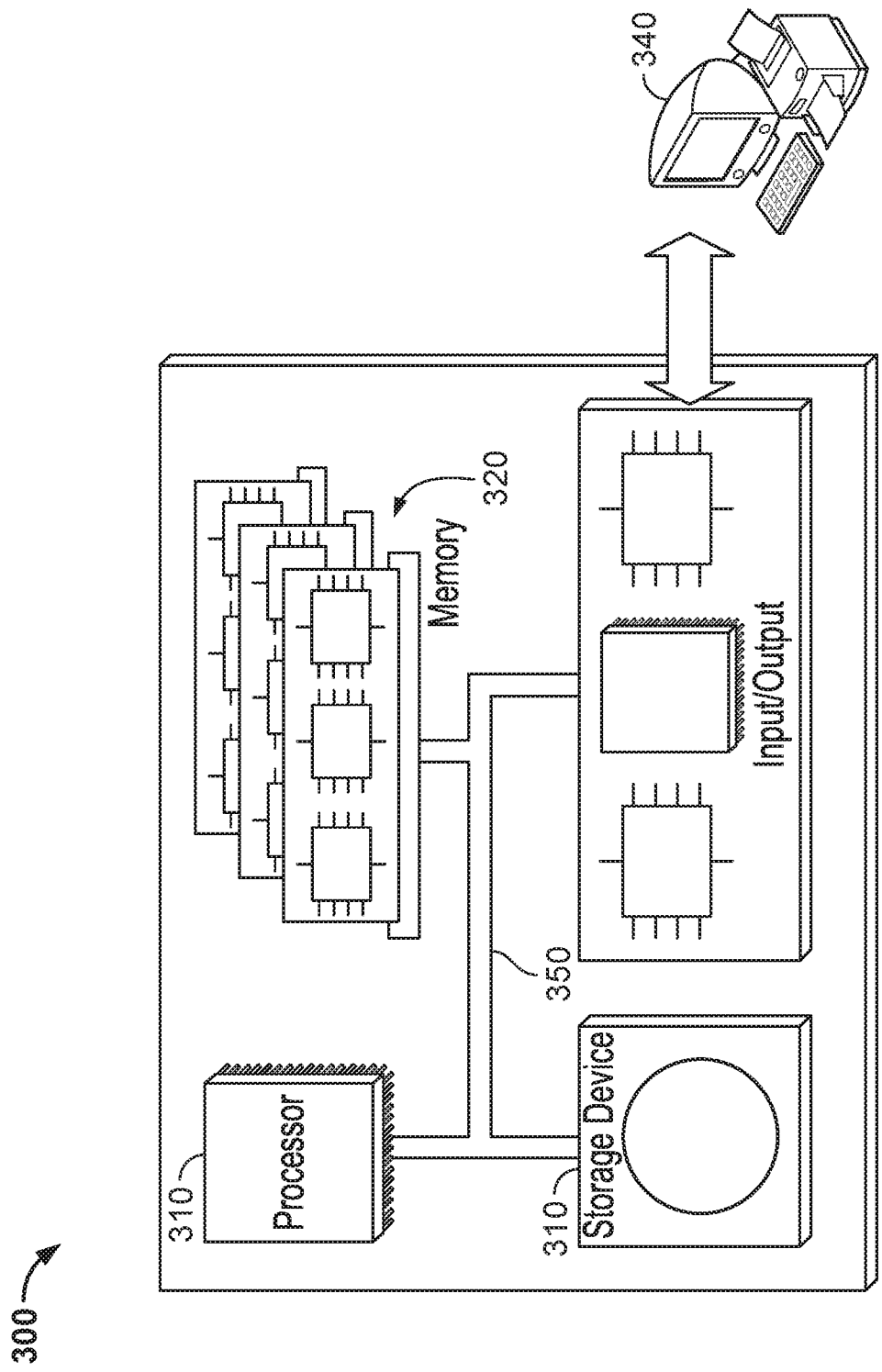
FIG. 3 shows a schematic drawing of a control system that can be used in the example implementations of FIGS. 1 and 2 according to the present disclosure.

FIG. 3 is a schematic illustration of an example control system 300 for a lubricant management system according to the present disclosure. For example, all or parts of the control system (or controller) 300 can be used for the operations described previously, for example as or as part of the control system 999 shown in FIGS. 1 and 2. The controller 300 is intended to include various forms of digital computers, such as printed circuit boards (PCB), processors, digital circuitry, or otherwise. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 300 includes a processor 310, a memory 320, a storage device 330, and an input/output device 340. Each of the components 310, 320, 330, and 340 are interconnected using a system bus 350. The processor 310 is capable of processing instructions for execution within the controller 300. The processor may be designed using any of a number of architectures. For example, the processor 310 may be a CISC (Complex Instruction Set Computers) processor, a RISC (Reduced Instruction Set Computer) processor, or a MISC (Minimal Instruction Set Computer) processor.

In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the control system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the controller 300. In one implementation, the storage device 330 is a computer-readable medium. In various different implementations, the storage device 330 may be a floppy disk device, a hard disk device, an optical disk device, a tape device, flash memory, a solid state device (SSD), or a combination thereof.

The input/output device 340 provides input/output operations for the controller 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A lubricant management system, comprising:
    a reservoir comprising an interior volume configured to enclose a lubricant fluid that comprises liquid water;
    a blower comprising:
        a blower inlet in fluid communication with a vapor space that encloses water vapor within the interior volume of the reservoir above the lubricant fluid, and
        a blower outlet external to the reservoir, the blower configured to circulate a first airflow that includes at least a portion of the water vapor from the vapor space to an ambient environment through the blower outlet;
    a heater that comprises:
        a heater outlet in fluid communication with the vapor space within the interior volume of the reservoir, and
        a heater inlet external to the reservoir, the heater configured to circulate a second airflow into the heater inlet, heat the second airflow to a particular temperature, and circulate the heated airflow into the vapor space;
    an outlet positioned in the reservoir, the outlet comprising a valve configured to operate to release at least a portion of the liquid water from the interior volume of the reservoir; and
    a control system communicably coupled to the blower, the heater, and the valve.

2. The lubricant management system of claim 1, further comprising a moisture sensor positioned in the interior volume and configured to sense an amount of the liquid water in the lubricant fluid when at least partially submerged in the lubricant fluid, wherein the control system is configured to perform operations comprising:
    comparing the sensed amount of the liquid water with a threshold value of liquid water; and
    based on the sensed amount exceeding the threshold value of liquid water, operating the valve to modulate toward fully open.

3. The lubricant management system of claim 2, further comprising a motor controller electrically connected to the blower, wherein the control system is configured to perform operations comprising:
    based on the sensed amount exceeding the threshold value of liquid water, operating the motor controller to increase a volumetric flow rate of the first airflow.

4. The lubricant management system of claim 3, further comprising a pressure sensor positioned in the vapor space of the reservoir and configured to sense an air pressure of the vapor space, wherein the control system is configured to perform operations comprising:
    comparing the sensed air pressure with a threshold value of air pressure; and
    based on the sensed air pressure different than the threshold value of air pressure, operating the motor controller to change the volumetric flow rate of the first airflow.

5. The lubricant management system of claim 2, wherein the control system is configured to perform operations comprising at least one of:
    based on the sensed amount exceeding the threshold value of liquid water, operating the heater to increase a volumetric flow rate of the second airflow; or
    based on the sensed amount exceeding the threshold value of liquid water, operating the heater to increase a temperature of the second airflow.

6. The lubricant management system of claim 5, wherein a relative humidity of the second airflow is less than a relative humidity of the first airflow, and the temperature of the second airflow is greater than a temperature of the first airflow.

7. The lubricant management system of claim 1, further comprising one or more baffles coupled to a bottom surface of the reservoir that extends into the interior volume, the one or more baffles comprising a bore therethrough at or near the bottom surface of the reservoir.

8. The lubricant management system of claim 7, wherein the one or more baffles comprises one or more first baffles, the system further comprising one or more second baffles coupled to a top surface of the reservoir that extends into the vapor space.

9. The lubricant management system of claim 1, wherein the lubricant fluid comprises a lubricant oil configured to lubricate at least a portion of a rotating machine.

10. A method for managing a lubricant fluid, comprising:
    storing a lubricant fluid that comprises liquid water in an interior volume of a reservoir, the interior volume comprising a vapor space above the lubricant fluid that encloses water vapor;
    circulating, with a blower, a first airflow from the vapor space to an ambient environment to remove at least a portion of the water vapor to the ambient environment;
    circulating a second airflow to a heater in fluid communication with the vapor space within the interior volume of the reservoir;
    heating the second airflow with the heater;
    circulating the heated airflow into the vapor space to reduce a relative humidity of the vapor space; and
    releasing at least a portion of the liquid water from the interior volume of the reservoir through a control valve coupled to the reservoir.

11. The method of claim 10, further comprising:
    sensing an amount of the liquid water in the lubricant fluid;
    comparing the sensed amount of the liquid water with a threshold value of liquid water; and based on the sensed amount exceeding the threshold value of liquid water, modulating the control valve toward fully open.

12. The method of claim 11, further comprising, based on the sensed amount exceeding the threshold value of liquid water, operating the blower to initiate or increase a volumetric flow rate of the first airflow.

13. The method of claim 12, further comprising:
sensing an air pressure in the vapor space;
comparing the sensed air pressure with a threshold value of air pressure; and
based on the sensed air pressure different than the threshold value of air pressure, operating the blower to change the volumetric flow rate of the first airflow.

14. The method of claim 11, further comprising at least one of:
based on the sensed amount exceeding the threshold value of liquid water, operating the heater to initiate or increase a volumetric flow rate of the second airflow; or
based on the sensed amount exceeding the threshold value of liquid water, operating the heater to increase a temperature of the second airflow.

15. The method of claim 14, wherein a relative humidity of the second airflow is less than a relative humidity of the first airflow, and the temperature of the second airflow is greater than a temperature of the first airflow.

16. The method of claim 10, further comprising facilitating a flow of the lubricant fluid through a bore of one or more baffles coupled to a bottom surface of the reservoir and extending into the interior volume.

17. The method of claim 10, wherein the lubricant fluid comprises a lubricant oil configured to lubricate at least a portion of a rotating machine.

18. A system, comprising:
a tank comprising an interior volume configured to enclose a lube oil that comprises water;
a fan positioned with an inlet in airflow communication with a vapor space that encloses water vapor within the interior volume of the tank above the lubricant fluid;
a heater positioned with an outlet in airflow communication with the vapor space;
a moisture sensor positioned in the interior volume to contact the lubricant fluid; and
a control system communicably coupled to the fan, the heater, and the moisture sensor and configured to perform operations comprising:
receiving a value of sensed water in the lube oil, and
based on the value of sensed water being greater than a predetermined value of water, opening a valve to release a portion of the water from the tank and operating the heater to flow heated air into the vapor space.

19. The system of claim 18, wherein the operations further comprise:
based on the value of sensed water being greater than the predetermined value of water, operating the fan to flow at least a portion of the water vapor from the vapor space to an ambient environment.

20. The system of claim 19, wherein the value is a first value and the operations further comprise:
receiving a second value of sensed water in the lube oil subsequent to the first value, and
based on the second value of sensed water being less than the predetermined value of water, operating the heater to stop or decrease the flow of heated air into the vapor space.

21. The system of claim 20, wherein the operations further comprise receiving a value of sensed air pressure in the vapor space.

22. The system of claim 21, wherein based on the value of sensed air pressure being less than a predetermined value of air pressure, the operations further comprise at least one of:
operating an airflow valve in fluid communication with the vapor space toward a fully open position; or
operating the fan to decrease an airflow from the vapor space to the ambient environment.

23. The system of claim 21, wherein based on the value of sensed air pressure being greater than a predetermined value of air pressure, the operations further comprise at least one of:
operating an airflow valve in fluid communication with the vapor space toward a fully closed position; or
operating the fan to increase an airflow from the vapor space to the ambient environment.

* * * * *